United States Patent
Fan et al.

(10) Patent No.: US 10,025,133 B1
(45) Date of Patent: Jul. 17, 2018

(54) LIQUID CRYSTAL DISPLAY DEVICE

(71) Applicant: CHUNGHWA PICTURE TUBES, LTD., Taoyuan (TW)

(72) Inventors: Ming-Hsiung Fan, Taoyuan (TW); Chih-Chien Tung, Taipei (TW); Chih-Chuan Chen, Taoyuan (TW)

(73) Assignee: CHUNGHWA PICTURE TUBES, LTD., Taoyuan (TW)

( * ) Notice: Subject to any disclaimer, the term of this patent is extended or adjusted under 35 U.S.C. 154(b) by 0 days.

(21) Appl. No.: 15/493,157

(22) Filed: Apr. 21, 2017

(30) Foreign Application Priority Data

Mar. 6, 2017 (CN) .......................... 2017 1 0126942

(51) Int. Cl.
*G02F 1/1335* (2006.01)
*G02F 1/1343* (2006.01)
*G02F 1/1362* (2006.01)

(52) U.S. Cl.
CPC .... *G02F 1/133514* (2013.01); *G02F 1/13439* (2013.01); *G02F 1/133512* (2013.01); *G02F 1/134309* (2013.01); *G02F 1/136286* (2013.01); *G02F 2001/133519* (2013.01); *G02F 2001/134381* (2013.01); *G02F 2201/123* (2013.01)

(58) Field of Classification Search
CPC .......................................... G02F 2001/134381
See application file for complete search history.

(56) References Cited

U.S. PATENT DOCUMENTS

| 2008/0186439 A1* | 8/2008 | Kwon | .............. G02F 1/136286 349/139 |
| 2015/0346567 A1* | 12/2015 | Hoshina | ............ G02F 1/134363 349/139 |
| 2016/0216568 A1* | 7/2016 | Li | ..................... G02F 1/134309 |

FOREIGN PATENT DOCUMENTS

| CN | 205080344 U | 3/2016 |
| TW | I490602 B | 7/2015 |

* cited by examiner

*Primary Examiner* — Phu Vu
(74) *Attorney, Agent, or Firm* — CKC & Partners Co., Ltd.

(57) ABSTRACT

A liquid crystal display device comprises an array substrate, a liquid crystal layer, and a color filter substrate. The liquid crystal layer is disposed between the array substrate and the color filter substrate. The color filter substrate includes a base material, an overcoat, a color filter layer and first transparent electrode patterns. The overcoat is disposed between the base material and the liquid crystal layer. The color filter layer is disposed between the base material and the overcoat, and includes color filter elements separated from each other and black matrixes. The first transparent electrode patterns are disposed between the overcoat and the liquid crystal layer, and are separated from each other and opposed to the black matrixes. A width of each of the black matrixes is equal to or greater than a width of each of the first transparent electrode patterns.

10 Claims, 3 Drawing Sheets

LIQUID CRYSTAL DISPLAY DEVICE

CROSS-REFERENCE TO RELATED APPLICATION

This application claims priority to Chinese Application Serial Number 201710126942.8, filed Mar. 6, 2017, which is herein incorporated by reference.

BACKGROUND

Field of Invention

The present invention relates to a display device.

Description of Related Art

Multimedia technology in today's society has been quite developed, and it is mostly benefited from the progress of semiconductor components and display devices. Among display devices, a liquid crystal display device having the advantages of high quality, excellent space utilization efficiency, low power consumption, no radiation, and the like has become a mainstream product in the market. In general, the liquid crystal display device is mainly composed of an active element array substrate, a color filter substrate and a liquid crystal layer disposed between those two substrates, in which a fringe field switching (FFS) technology is a wide viewing angle technology widely used in the current liquid crystal display devices.

Furthermore, in order to overcome an unexpected light leakage problem, a conventional liquid crystal display device will arrange the black matrixes (BM) on the color filter substrate or an active element array substrate to shade the regions of the active element array substrate that may cause the light leakage. However, as the current liquid crystal display technology has been developed towards the requirement of high-resolution, sizes of the black matrixes are becoming smaller and smaller in order to enable the display panel with high-resolution to maintain a better transmittance. In this case, if the active element array substrate and the color filter substrate are slightly offset, the light transmitted through the adjacent pixel regions will be likely to be observed by an observer in a certain oblique direction. As such, the observer will observe two colors mixed in the oblique direction, and thus the phenomenon of color mixing is generated, and the display performance of the liquid crystal display device is deteriorated.

SUMMARY

The present disclosure provides a liquid crystal display device with good display performance.

The present disclosure provides a liquid crystal display device. The liquid crystal display device includes an array substrate, a liquid crystal layer, and a color filter substrate. The liquid crystal layer is disposed between the array substrate and the color filter substrate. The color filter substrate includes a base material, an overcoat, a color filter layer and first transparent electrode patterns. The overcoat is disposed between the base material and the liquid crystal layer. The color filter layer is disposed between the base material and the overcoat, and includes color filter elements separated from each other and black matrixes. The first transparent electrode patterns are disposed between the overcoat and the liquid crystal layer, and are separated from each other and opposite to the black matrixes. A width of each of the black matrixes is equal to or greater than a width of each of the first transparent electrode patterns.

In some embodiments of the disclosure, projection ranges of the black matrixes on a horizontal plane respectively cover projection ranges of the first transparent electrode patterns on the horizontal plane.

In some embodiments of the disclosure, each of the first transparent electrode patterns has a long strip shape.

In some embodiments of the disclosure, the array substrate includes data lines extending in a first direction, and the first transparent electrode patterns are arranged in a second direction that is substantially perpendicular to the first direction.

In some embodiments of the disclosure, each of the data lines corresponds to each of the first transparent electrode patterns, and projection ranges of the data lines and projection ranges of the first transparent electrode patterns are respectively overlapped on a horizontal plane.

In some embodiments of the disclosure, the array substrate includes pixel electrodes, and positions of the pixel electrodes respectively correspond to the filter elements of the color filter substrate. When the liquid crystal layer is in a bright state, there is a voltage difference between each of the pixel electrodes and its adjacent first transparent electrode patterns, and the voltage difference is less than 3 volts.

In some embodiments of the disclosure, when the liquid crystal layer is in the bright state, there is a dark band between adjacent pixel electrodes and a width of the dark band is between 4.2 micrometers and 4.6 micrometers.

In some embodiments of the disclosure, the width of each of the black matrixes is between 4 micrometers and 6 micrometers.

In some embodiments of the disclosure, the width of each of the first transparent electrode patterns is between 4 micrometers and 6 micrometers.

In some embodiments of the disclosure, the color filter layer and the first transparent electrode patterns are disposed on both sides of the overcoat respectively.

According to the foregoing, the liquid crystal display device of the embodiments of the disclosure can form a wider dark band between the pixel regions by using the configuration of the first transparent electrode patterns, thereby elevating the view angle that may cause the phenomenon of color mixing. Therefore, the liquid crystal display device can achieve a good display performance.

BRIEF DESCRIPTION OF THE DRAWINGS

Aspects of the present disclosure are best understood from the following detailed description when read in association with the accompanying figures. It is noted that, in accordance with the standard practice in the industry, various features in drawings are not drawn to scale. In fact, the dimensions of illustrated features may be arbitrarily increased or decreased for clarity of discussion.

DETAILED DESCRIPTION

Figure 1:
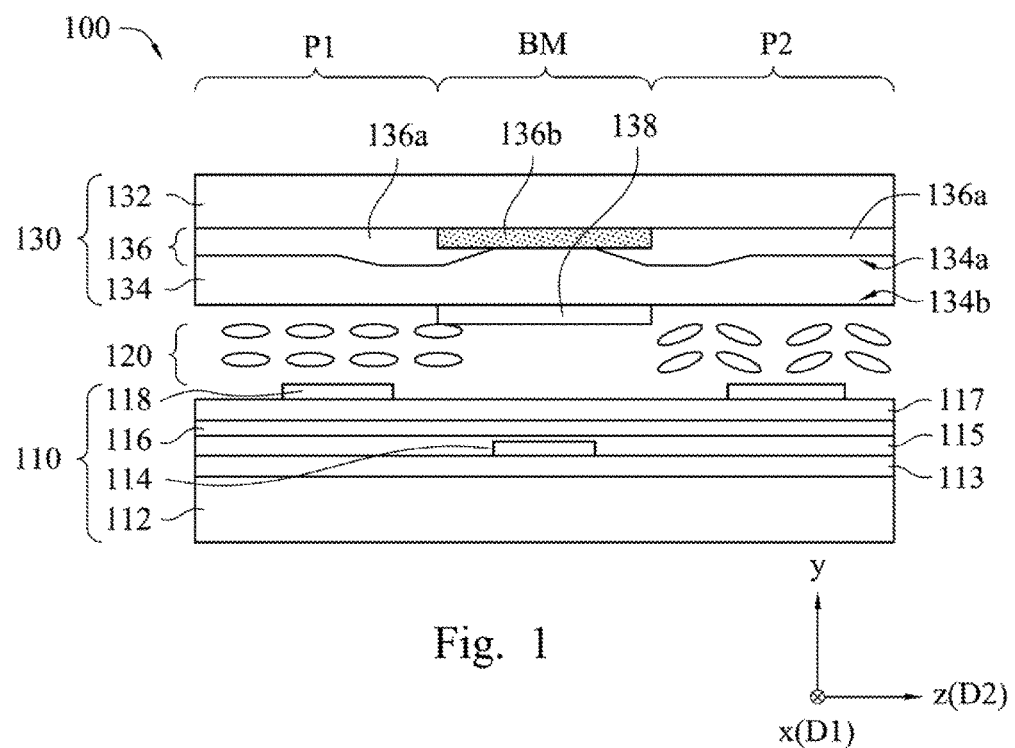
FIG. 1 is a schematic view of a liquid crystal display device according to an embodiment of the disclosure.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Referring to FIG. 1, FIG. 1 is a schematic view of a liquid crystal display device 100 according to an embodiment of the disclosure. The liquid crystal display device 100 of the present embodiment includes an array substrate 110, a liquid crystal layer 120, and a color filter substrate 130. For example, in the present embodiment, the liquid crystal display device 100 is a fringe field switching liquid crystal display panel, but the present disclosure is not limited thereto.

In the present embodiment, as shown in FIG. 1, the liquid crystal layer 120 is disposed above the array substrate 110, and the color filter substrate 130 is disposed above the liquid crystal layer 120. In other words, the liquid crystal layer 120 is disposed between the array substrate 110 and the color filter substrate 130. For example, in the present embodiment, the liquid crystal layer 120 may include nematic liquid crystal molecules, and the alignment direction thereof is parallel to the vertical direction Y, but the present disclosure should not be limited herein.

As shown in FIG. 1, in the present embodiment, the array substrate 110 includes a base material 112, data lines 114, scanning lines 116, and pixel electrodes 118. The data lines 114 extend in a first direction D1, the scanning lines 116 extend in a second direction D2, and the first direction D1 is substantially perpendicular to the second direction D2. In the present embodiment, the first direction D1 is, for example, a direction X, and the second direction D2 is, for example, a direction Z, but the present disclosure is not limited thereto. In addition, the array substrate 110 further includes insulating layers 113, 115, and 117.

On the other hand, the color filter substrate 130 includes a base material 132, an overcoat 134, a color filter layer 136 and first transparent electrode patterns 138. In the present embodiment, the base material 132, for example, is a glass. In addition, the pixel electrodes 118 may be transparent electrodes, and materials forming the pixel electrodes 118 and the first transparent electrode patterns 138 may include various transparent conductive materials such as indium tin oxide (ITO) or other suitable transparent conductive material, but the present disclosure is not limited thereto.

As shown in FIG. 1, in the present embodiment, the overcoat 134 is disposed between the base material 132 of the color filter substrate 130 and the liquid crystal layer 120 in which a first side 134a of the overcoat 134 faces the base material 132 and a second side 134b of the overcoat 134 faces the liquid crystal layer 120. The color filter layer 136 is disposed between the base material 132 and the overcoat 134 and is adjacent to the first side 134a of the overcoat 134. The first transparent electrode patterns 138 are disposed between the overcoat 134 and the liquid crystal layer 120 and are adjacent to the second side 134b of the overcoat 134. In other words, in the present embodiment, the color filter layer 136 and the first transparent electrode patterns 138 are disposed on both sides of the overcoat 134 respectively.

Furthermore, as shown in FIG. 1, in the present embodiment, the color filter layer 136 includes pixel regions P1 and P2 separated from each other and shading regions BM. The color filter layer 136 of the color filter substrate 130 further includes color filter elements 136a separated from each other and black matrixes 136b (for briefness, only one black matrix 136b is shown in the figure). For example, in the present embodiment, the color filter elements 136a include a red filter element, a green filter element, or a blue filter element, and the color filter elements 136a are disposed in the pixel regions P1 are P2 correspondingly. The black matrixes 136b are disposed in the shading regions BM correspondingly, and each of the black matrixes 136b is disposed between the adjacent color filter elements 136a. In addition, in the present embodiment, the pixel electrodes 118 of the array substrate 110 correspond to the pixel regions P1 and P2 respectively. By using the configurations, the corresponding pixel regions P1 and P2 may display the colors of the color filter elements 136a therein when the liquid crystal layer 120 is driven by the pixel electrodes 118 to be at a bright state, so as to define red pixel regions, green pixel regions and blue pixel regions to render a color picture.

It should be noted that, for convenience, FIG. 1 mainly shows the relative relationships among the thicknesses of the layers such as the liquid crystal layer 120, and the base material 132, the overcoat 134, each of the color filter elements 136a and the black matrixes 136b, but not the actual sizes of the layers, for convenience. For example, in the present embodiment, the thickness of the liquid crystal layer 120 is substantially between 2.8 micrometers and 3.2 micrometers; the thickness of the base material 132 or the overcoat 134 of the color filter substrate 130 is substantially between 1.5 micrometers and 3 micrometers; the thickness of each of the color filter elements 136a and the black matrixes 136b is substantially between 1.5 micrometers and 2.5 micrometers. It should be noted that the above parameter ranges are merely shown as examples, and do not intended to limit the present disclosure.

On the other hand, in the present embodiment, as shown in FIG. 1, the first transparent electrode patterns 138 of the color filter substrate 130 are separated from each other and opposite to the black matrixes 136b. As shown in FIG. 1, each of the first transparent electrode patterns 138 has a long strip shape and is arranged in the second direction D2. In other words, in the present embodiment, a projection range of each of the data lines 114 of the array substrate 110, a projection range of each of the first transparent electrode patterns 138 and a projection range of each of the black matrixes 136b of the color filter substrate 130 on a horizontal plane (i.e. X-Z plane) are overlapped. As shown in FIG. 1, in the present embodiment, a width of each of the black matrixes 136b is equal to or greater than a width of each of the first transparent electrode patterns 138. For example, the width of each of the black matrixes 136b is between about 4 micrometers and about 6 micrometers, and the width of each of the first transparent electrode patterns 138 is between about 4 micrometers and about 6 micrometers. It should be noted that the above parameter ranges are merely as examples and do not intend to limit the present disclosure.

In the present embodiment, as shown in FIG. 1, the projection range of each of the black matrixes 136b on the horizontal plane (i.e. X-Z plane) covers the projection range of each of the first transparent electrode patterns 138 on the horizontal plane, and the projection range of each of the first transparent electrode patterns 138 on the horizontal plane is limited in the projection range of each of the black matrixes 136b on the horizontal plane.

In this way, by the configuration of the first transparent electrode patterns 138 described above, there is a voltage difference between the first transparent electrode patterns 138 of the color filter substrate 130 and the pixel electrodes 118 of the array substrate 110 when the liquid crystal layer 120 is in a bright state, thereby forming a vertical electric field to push the arrangement of the liquid crystal. A wider dark band DB, therefore, is formed between the pixel regions P1 and P2 (or the pixel electrodes 118), thereby elevating the view angle that may cause the phenomenon of color mixing and enabling the liquid crystal display device 100 to achieve a good display performance.

Further explanation is provided in the below with reference to FIG. 2 to FIG. 3B.

Figure 2:
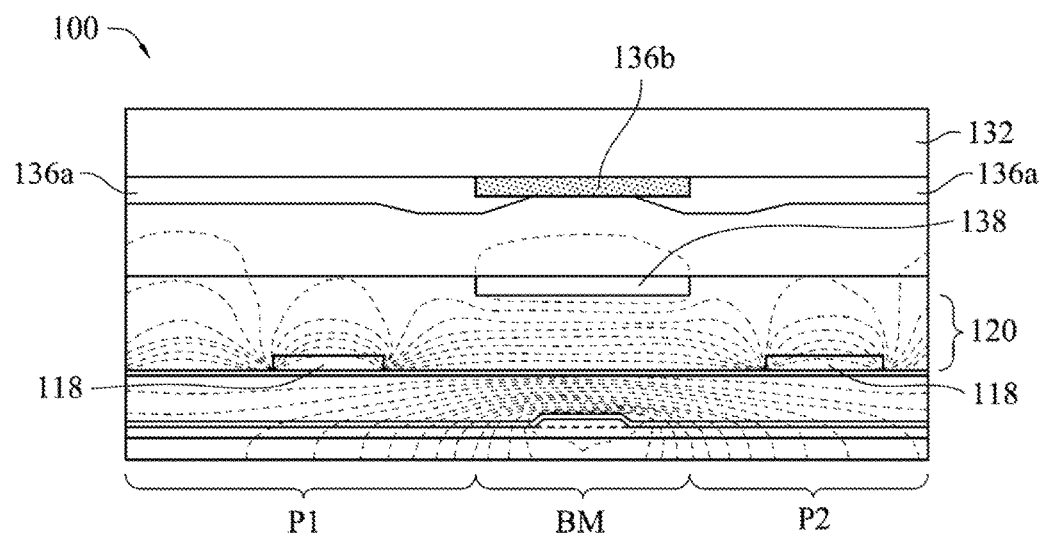
FIG. 2 is a schematic view of equipotential lines of a liquid crystal display device according to an embodiment of the disclosure.
Figure 3A:
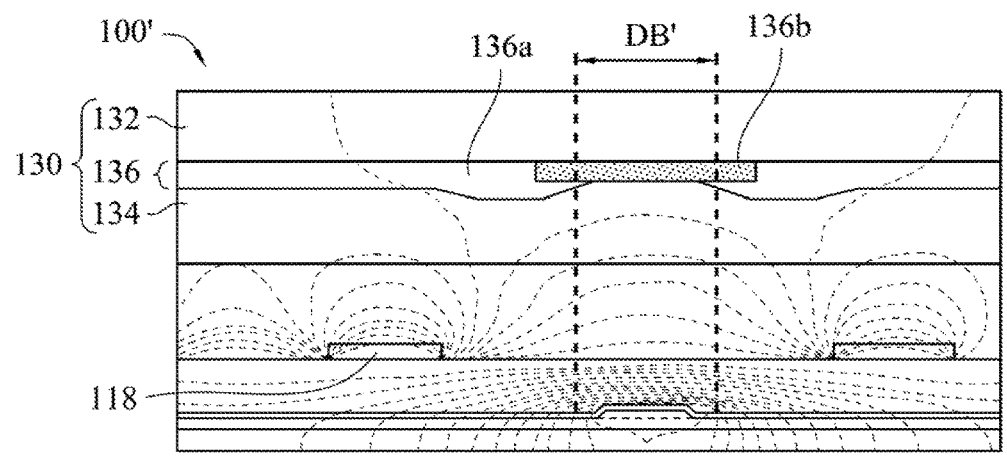
FIG. 3A is a schematic view of a width of a dark band of a liquid crystal display device according to a comparative example.
Figure 3B:
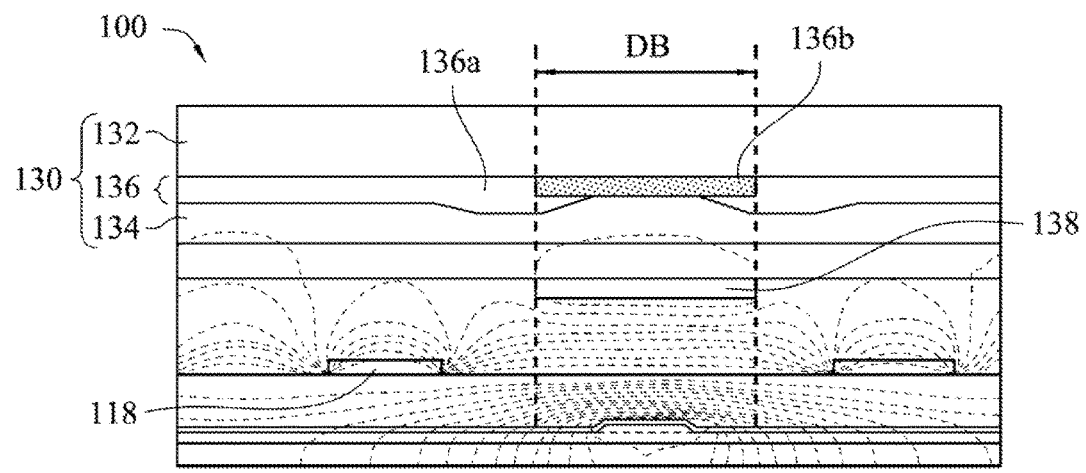
FIG. 3B is a schematic view of a width of a dark band of a liquid crystal display device according to an embodiment of the disclosure.

FIG. 2 is a schematic view of equipotential lines of a liquid crystal display device 100 according to an embodiment of the disclosure. FIG. 3A is a schematic view of a width of a dark band DB' of a liquid crystal display device 100' according to a comparative example. FIG. 3B is a schematic view of a width of a dark band DB of a liquid crystal display device 100 according to an embodiment of the disclosure. Referring to FIG. 2, in the present embodiment, when the liquid crystal layer 120 is in a bright state, there is a voltage difference between each of the pixel electrodes 118 and its adjacent first transparent electrode patterns 138, and the voltage difference is less than 3 volts. In this way, as shown in FIG. 2, the liquid crystal display device 100 forms a vertical electric field to push the arrangement of the liquid crystal when the liquid crystal layer 120 is in the bright state, and the equipotential lines is now flattened in the thickness direction of the liquid crystal layer 120, thereby forming a wider dark band DB between the pixel regions P1 and P2.

Furthermore, as shown in FIG. 3A, in the absence of the configuration of the first transparent electrode patterns 138, a width of a dark band DB' of the liquid crystal display device 100' is about 3.2 micrometers when the liquid crystal layer 120 is in a bright state. However, as shown in FIG. 3B, a width of a dark band DB of the liquid crystal display device 100 is between about 4.2 micrometers and about 4.6 micrometers. In other words, compared to the liquid crystal display device 100', the liquid crystal display device 100 of the present embodiment may form a wider dark band DB between the pixel regions P1, P2 (or the pixel electrodes 118) in the above-described configuration, and may elevate the view angle that may cause the phenomenon of color mixing. Therefore, the liquid crystal display device 100 can achieve a good display performance even if the array substrate 110 and the color filter substrate 130 are slightly offset.

Further explanation is provided in the below with reference to FIG. 4A to FIG. 4B.

Figure 4A:
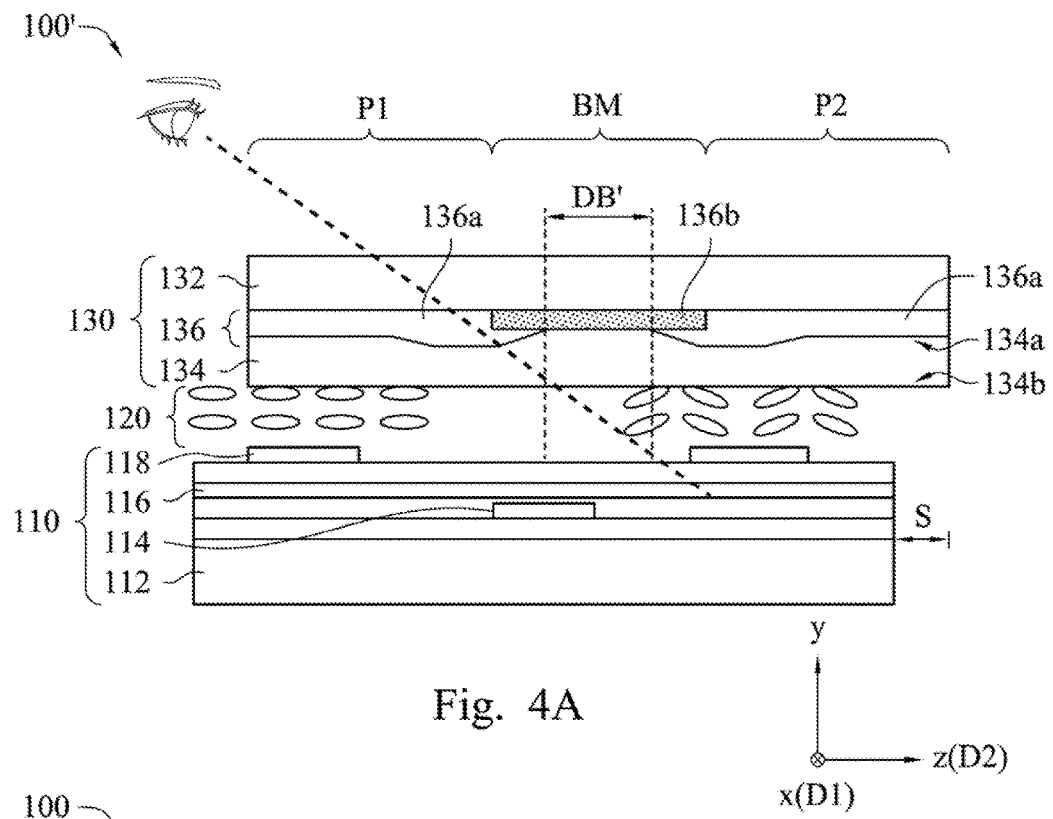
FIG. 4A is a schematic view of an optical path of liquid crystal display device when its array substrate and the color filter substrate are offset according to a comparative example.

FIG. 4A is a schematic view of an optical path of the liquid crystal display device 100' when its array substrate 110 and the color filter substrate 130 are offset according to a comparative example. FIG. 4B is a schematic view of an optical path of the liquid crystal display device 100 when its array substrate 110 and the color filter substrate 130 are offset according to an embodiment of the disclosure. Referring to FIGS. 4A and 4B, as shown in FIG. 4A, since the width of the dark band DB' between the pixel regions P1, P2 of the liquid crystal display device 100' is smaller, the black matrixes 136b cannot completely shade the light of the array substrate 110 transmitted through the edge of the bright band of the adjacent pixel region P2 from a certain oblique direction when the array substrate 110 and the color filter substrate 130 are slightly offset, and thus light leakage occurs. Further, when a shift S generated by assembling is bigger, the angle of the light leakage will be smaller, and the phenomenon of color mixing will be observed at a smaller oblique view angle. For example, in this comparative example, when the shift S generated by assembling is about 3.5 micrometers, the phenomenon of color mixing is observed when the oblique view angle is about 30 degrees.

Figure 4B:
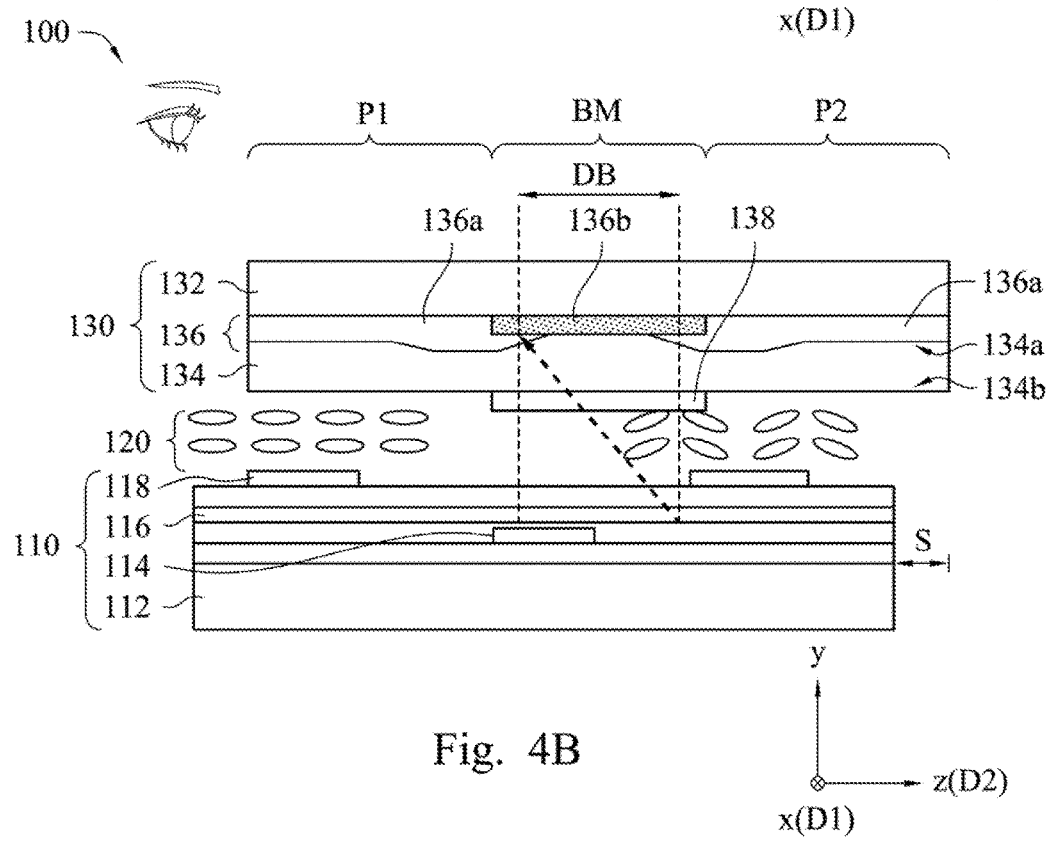
FIG. 4B is a schematic view of an optical path of a liquid crystal display device when its array substrate and the color filter substrate are offset according to an embodiment of the disclosure.

On the other hand, as shown in FIG. 4B, the width of the dark band DB between the pixel regions P1 and P2 of the liquid crystal display device 100 is wider. In this way, when the assembly of the array substrate 110 and the color filter substrate 130 of the liquid crystal display device 100 has the same degree of deviation as the assembly of the liquid crystal display device 100' of the comparative example, the black matrixes 136b still can shade the light transmitted through the pixel region P2 from the above-mentioned oblique direction.

That is, in this way, the view angle that may cause the phenomenon of color mixing may be elevated. For example, in the present embodiment, in the same case where the shift S generated at the time as assembling is about 3.5 micrometers, the view angle likely causing the phenomenon of color mixing may be elevated up to about 42 degrees. In this way, the observer will be less likely to see the light transmitted through the adjacent pixel region P2 in the specific oblique direction, and thus the liquid crystal display device 100 can achieve a good display performance.

In addition, since the liquid crystal display device 100 elevates the view angle which may cause color mixing by forming a wider dark band DB between the pixel regions P1 and P2 (or the pixel electrodes 118), the reduction of the transmittance is not significant. For example, the transmittance of the liquid crystal display device 100 shown in FIG. 4B is only about 5% lower than that of the liquid crystal display device 100' shown in FIG. 4A, and therefore, the liquid crystal display device 100 shown in FIG. 4B will be able to achieve a good display performance without affecting the overall brightness and resolution too much. In addition, the configuration of the first transparent electrode patterns 138 of the liquid crystal display device 100 can also be used to substitute the antistatic transparent electrode layer on the color filter substrate of the conventional liquid crystal display device. Thus, the process of the liquid crystal display device 100 of the present embodiment can be integrated with the process of the conventional liquid crystal display device, thereby taking into account the functions of the anti-static and achieving a good display performance without increasing the cost of the process.

As mentioned above, the liquid crystal display device of the embodiments of the disclosure can form a wider dark band between the pixel regions by the configuration of the first transparent electrode patterns, thereby elevating the view angle that may cause the phenomenon of color mixing. Therefore, the liquid crystal display device can achieve a good display performance.

It should be understood that the various methods and embodiments described above are only different embodiments of the present disclosure and are not intended to be limiting of the present disclosure. In the practical application, the user can design the appearance, the location of the configuration of the smart sensor. It can also be designed to the method for judging the dangerous position.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A liquid crystal display device, comprising:
   an array substrate;
   a liquid crystal layer; and
   a color filter substrate, wherein the liquid crystal layer is disposed between the array substrate and the color filter substrate, and the color filter substrate comprises:
   a base material;
   an overcoat disposed between the base material and the liquid crystal layer;
   a color filter layer disposed between the base material and the overcoat, wherein the color filter layer comprises a plurality of color filter elements separated from each other and a plurality of black matrixes, and an opening is formed between two of the color filter elements and is filled with the overcoat, and a portion of one of the black matrixes is in the opening and is in contact with the overcoat; and
   a plurality of first transparent electrode patterns disposed between the overcoat and the liquid crystal layer, wherein at least one portion of one of the color filter elements is between one of the black matrixes and one of the first transparent electrode patterns, the first transparent electrode patterns are separated from each other and opposite to the black matrixes, and a width of each of the black matrixes is equal to or greater than a width of each of the first transparent electrode patterns.

2. The liquid crystal display device of claim 1, wherein projection range of the black matrixes on a horizontal plane respectively cover projection ranges of the first transparent electrode patterns on the horizontal plane.

3. The liquid crystal display device of claim 1, wherein each of the first transparent electrode patterns has a long strip shape.

4. The liquid crystal display device of claim 3, wherein the array substrate comprises a plurality of data lines extending in a first direction, and the first transparent electrode patterns are arranged in a second direction that is substantially perpendicular to the first direction.

5. The liquid crystal display device of claim 4, wherein the data lines correspond to the first transparent electrode patterns respectively, and projection ranges of the data lines and projection ranges of the first transparent electrode patterns are respectively overlapped on a horizontal plane.

6. The liquid crystal display device of claim 1, wherein the array substrate comprises a plurality of pixel electrodes, positions of the pixel electrodes respectively correspond to the filter elements of the color filter substrate, and when the liquid crystal layer is in a bright state, there is a voltage difference between each of the pixel electrodes and its adjacent first transparent electrode patterns, and the voltage difference is less than 3 volts.

7. The liquid crystal display device of claim 6, wherein when the liquid crystal layer is in the bright state, there is a dark band between adjacent pixel electrodes and a width of the dark band is in a range between 4.2 micrometers and 4.6 micrometers.

8. The liquid crystal display device of claim 1, wherein the width of each of the black matrixes is in a range between 4 micrometers and 6 micrometers.

9. The liquid crystal display device of claim 1, wherein the width of each of the first transparent electrode patterns is in a range between 4 micrometers and 6 micrometers.

10. The liquid crystal display device of claim 1, wherein the color filter layer and the first transparent electrode patterns are disposed on both sides of the overcoat respectively.

* * * * *